United States Patent
Bokich

(10) Patent No.: US 6,921,256 B2
(45) Date of Patent: Jul. 26, 2005

(54) REPLACEABLE INSERT FOR MOLD LOCK

(75) Inventor: Michael Steven Bokich, El Paso, TX (US)

(73) Assignee: D-M-E Company, Madison Heights, MI (US)

( * ) Notice: Subject to any disclaimer, the term of this patent is extended or adjusted under 35 U.S.C. 154(b) by 120 days.

(21) Appl. No.: 10/433,551

(22) PCT Filed: Jan. 23, 2002

(86) PCT No.: PCT/US02/01881

§ 371 (c)(1),
(2), (4) Date: Jun. 4, 2003

(87) PCT Pub. No.: WO02/058911

PCT Pub. Date: Aug. 1, 2002

(65) Prior Publication Data

US 2004/0067274 A1 Apr. 8, 2004

Related U.S. Application Data

(60) Provisional application No. 60/285,786, filed on Apr. 23, 2001, and provisional application No. 60/263,961, filed on Jan. 24, 2001.

(51) Int. Cl.[7] .............................................. B29C 33/20
(52) U.S. Cl. ...................................... 425/190; 425/595
(58) Field of Search ................................. 425/107, 190, 425/192 R, 451.9, 595, 168, 195, 472

(56) References Cited

U.S. PATENT DOCUMENTS

| | | | |
|---|---|---|---|
| 4,932,857 A | * | 6/1990 | Nishino et al. ............. 425/394 |
| 5,238,640 A | * | 8/1993 | Masui et al. ................ 264/266 |
| 5,332,384 A | | 7/1994 | Abramat ..................... 425/522 |
| 5,762,977 A | | 6/1998 | Boskovic .................... 425/225 |
| 6,328,552 B1 | * | 12/2001 | Hendrickson et al. ...... 425/188 |
| 6,558,145 B2 | | 5/2003 | Wieder ....................... 425/107 |
| 2002/0044983 A1 | | 4/2002 | Wieder .................. 425/192 R |

OTHER PUBLICATIONS

D-M-E Company, catalog, 1997-1998, pp. K-22.6, K-22.7, K-22.8, K-22.9 and K-23R.

Progressive Components, catalog, (date unknown), pp. B-9, B-10, B-11, B-12, B-13, B-14 and B-15.

* cited by examiner

Primary Examiner—Benjamin L. Utech
Assistant Examiner—Joseph S. Del Sole
(74) Attorney, Agent, or Firm—John W. Gregg; Stephen H. Friskney

(57) ABSTRACT

A mold positioning system (10) for use in guiding and aligning mold segments (11, 13) includes a male member (12) having a tongue portion (14) on one mold segment that engages a female member (20) attached to the other mold segment when the mold assembly (8) is closed. The female and/or male member (20, 12) are configured to receive a replaceable insert (36) in the areas of the mold positioning system (10) that are subject to wear. The replaceable insert (36) is easily removable for replacement to increase the life of the male and female members (12, 20).

8 Claims, 5 Drawing Sheets

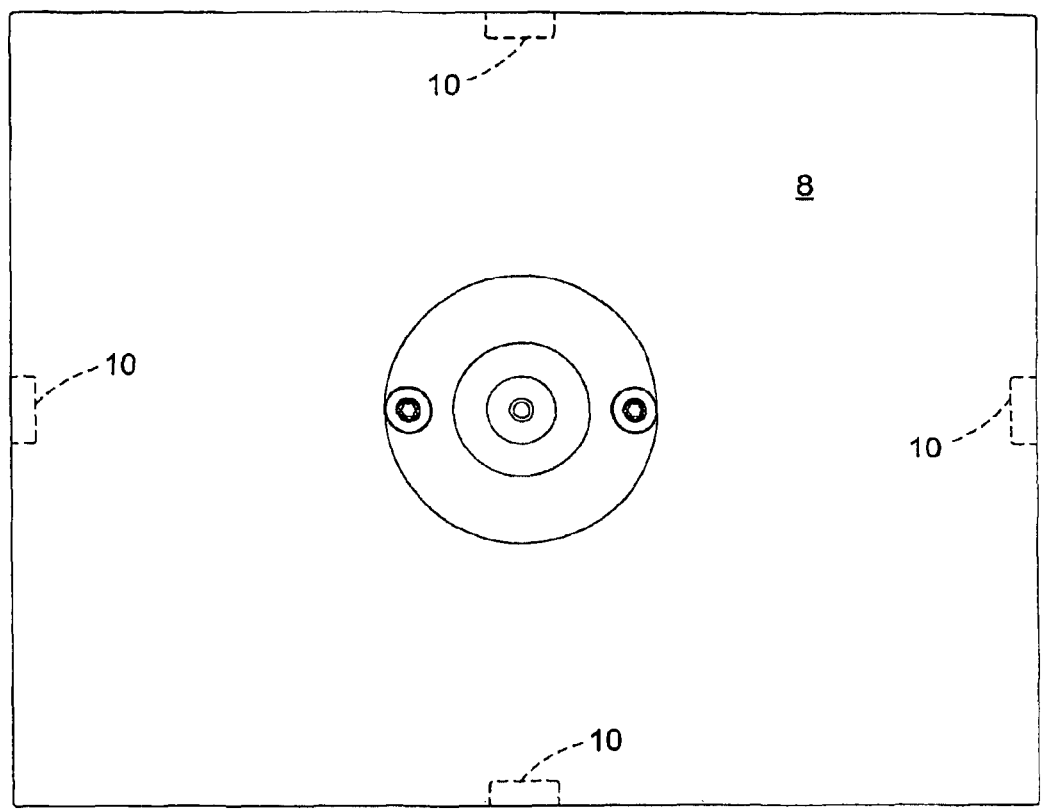
FIG. 3
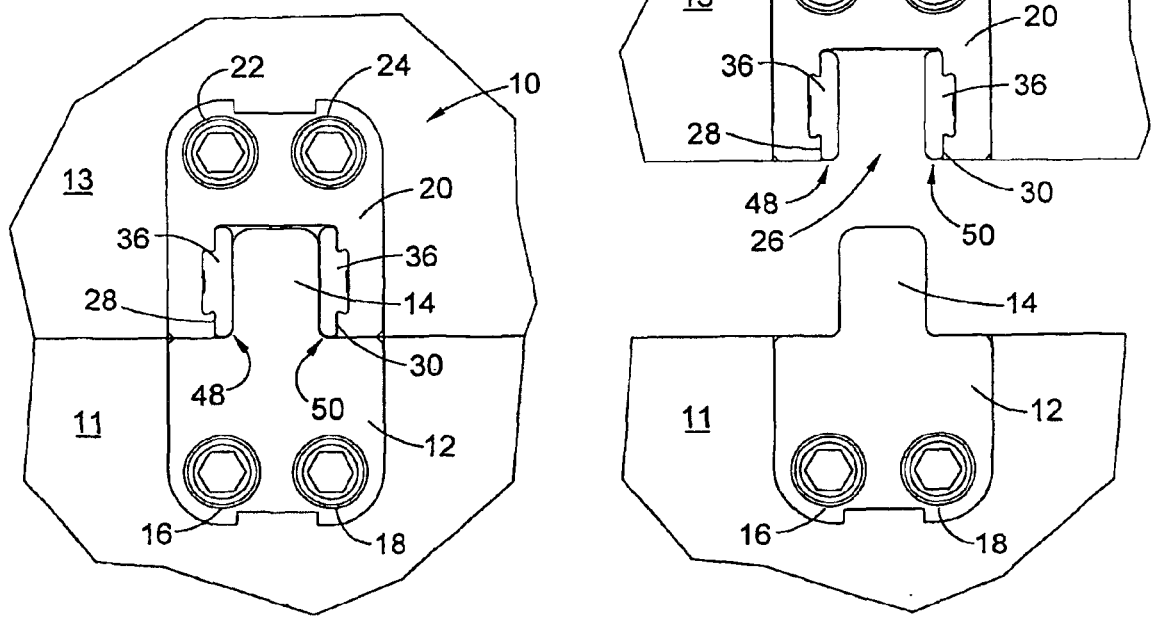
FIG. 5
FIG. 4

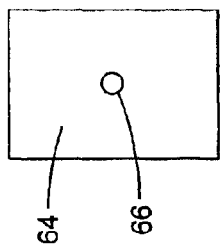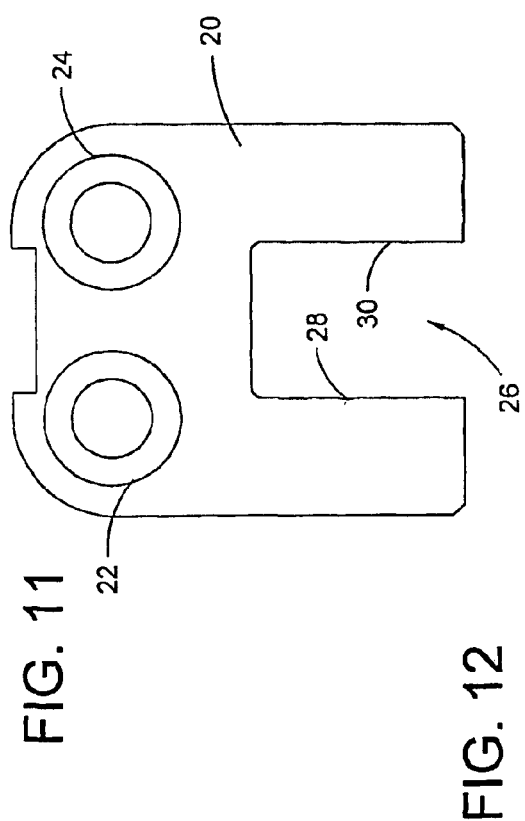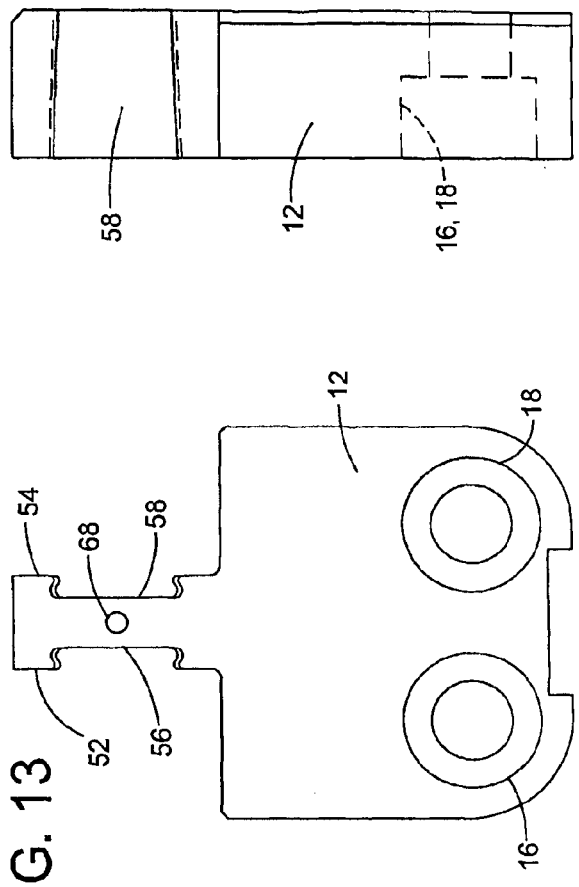

FIG. 16
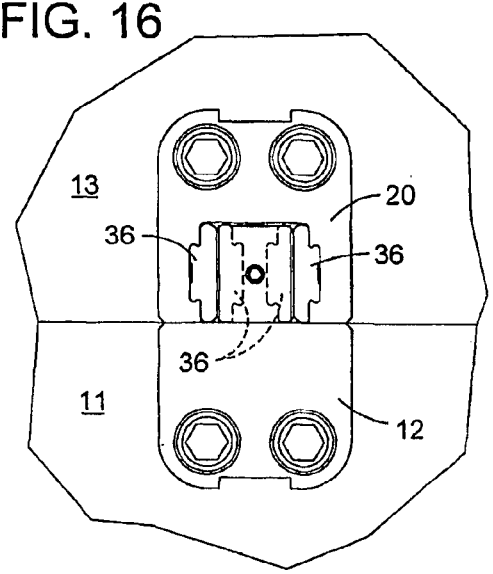
FIG. 17
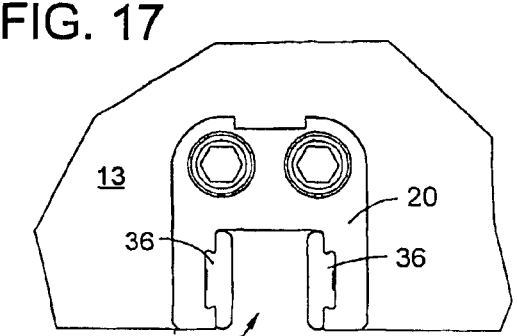
FIG. 18
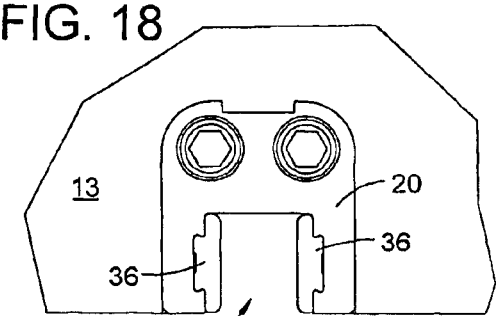
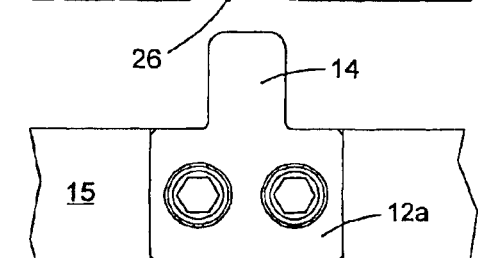
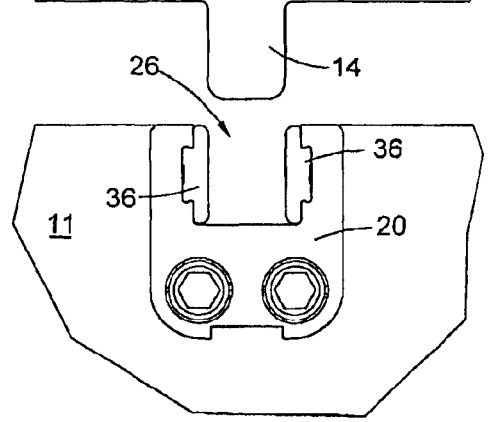
FIG. 19
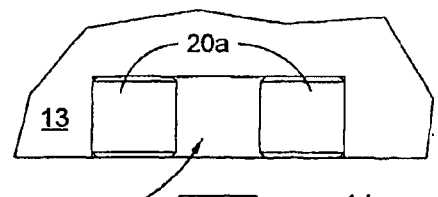
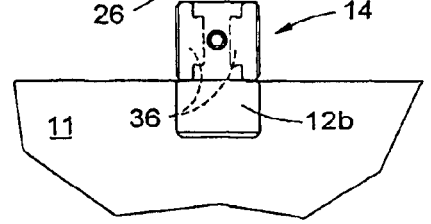

REPLACEABLE INSERT FOR MOLD LOCK

This application is a 371 of PCT/US02/01881 Jan. 23, 2002 which claims benefit of provisional 60/263,961 Jan. 24, 2001 and claims benefit of provisional 60/285,786 Apr. 23, 2001.

TECHNICAL FIELD

The present invention relates to a mold positioning system for guiding and aligning two mold segments in a mold assembly.

BACKGROUND ART

In the injection molding industry, products are formed by closing two mold segments to define a mold cavity and injecting plastic melt into the cavity. When the product is ready to be removed, the two mold segments are moved apart and the product is then ejected from the mold cavity. This process is effectively used to create thousands of products and steady developments in the industry have helped to find new uses for injection molding.

The industry also demands higher productivity and efficiency to lower product costs. One common method of increasing productivity is to increase the speed of the injection molding process. Consequently, as the speed of the molding process increases, the tolerance for error in positioning the two mold segments decreases. Many methods of guiding and aligning two mold segments are known in the art. A typical method is the use of a mold positioning system wherein a male member is attached to the side of one mold segment and a female member is attached to the corresponding side of the second mold segment. The two members engage one another when the mold assembly is closed to properly position the two mold segments relative to each.

The mold positioning system, however, is susceptible to wear and slight wear becomes problematic in molding processes that require high positioning precision. Additionally, highly repetitive processes can substantially increase the wear of the mold positioning system. Currently, the only remedy for the worn mold positioning system is full replacement, which increases costs and lowers productivity and efficiency. Therefore, there is a need in the industry for mold positioning systems that do not require replacement of the entire system when its components become worn.

DISCLOSURE OF INVENTION

The subject invention is a mold positioning system for use in guiding and aligning first and second mold segments in a mold assembly. The system includes a male member having a tongue portion and a pair of bores formed in the male member for allowing removable attachment to the first mold segment. The system further includes a female member having a second pair of bores formed therein for allowing removable attachment of the female member to the second mold segment. A groove having a first and second inner surface is formed within the female member for receiving the tongue portion of the male member when closing the mold assembly. A first channel is formed within at least one of the inner surfaces of the groove for receiving a replaceable insert having a base portion for positioning in the first channel and a flange portion for engaging the tongue portion of the male member when closing the mold assembly. The replaceable insert is removable from the first channel for replacement to increase the life of the male and female members. Alternative embodiments of the subject invention are also disclosed. A second embodiment includes all of the features identified above, however, the channel is removed from the inner surfaces of the groove and a channel is instead positioned in a first side of the tongue portion. Furthermore, the replaceable insert is positioned in the channel of the first side of the tongue portion. Additional embodiments directed to the use of the above-described replaceable inserts in concert with different combinations of the male and female members are also disclosed.

The limitations of prior mold positioning systems are overcome by the subject invention by providing a mold positioning system that allows for the use of replaceable inserts in the heavy wear areas of the system. The life of the male and female members is increased in the subject invention by utilizing replaceable inserts to provide an alternative wear surface for the system. Since the inserts are economical and easily changed, the system will help to reduce costs and increase productivity and efficiency.

BRIEF DESCRIPTION OF DRAWINGS

FIG. 3 is a top plan view of the mold assembly shown in FIG. 1.

FIG. 4 is an partial view of the mold assembly shown in FIG. 1, enlarged to show greater detail of the male and female members of the mold positioning system of the present invention.

FIG. 5 is a partial view similar to FIG. 4, showing the relative positions of the male and female members of the mold positioning system when the mold assembly is open.

FIG. 11 is a front elevational view of the female member of a second embodiment of the mold positioning system of the present invention.

FIG. 12 is a front elevational view showing the assembly of a plate and replaceable inserts on the male member of the second embodiment.

FIG. 13 is a front elevational view of the male member of the second embodiment without the plate and replaceable inserts.

FIG. 14 is a side elevational view of the male member of the second embodiment as shown in FIG. 13.

FIG. 15 is a front elevational view of the plate used with the male member of the second embodiment of the mold positioning system of the present invention.

FIG. 16 is a partial view of a closed mold assembly, enlarged to show the male and female members of a third embodiment of the mold positioning system of the present invention.

FIG. 17 is a partial view similar to FIG. 15, showing the relative positions of the male and female members of the third embodiment the mold positioning system when the mold assembly is open.

FIG. 18 is a partial view of an open mold assembly, enlarged to show the male and female members of a fourth embodiment of the mold positioning system of the present invention configured for use with a mold assembly having two parting lines.

FIG. 19 is a partial view of an open mold assembly, enlarged to show the male and female members of a mold positioning system according to the present invention for a typical parting line interlock for a mold assembly.

BEST MODE FOR CARRYING OUT THE INVENTION

Figure 1:
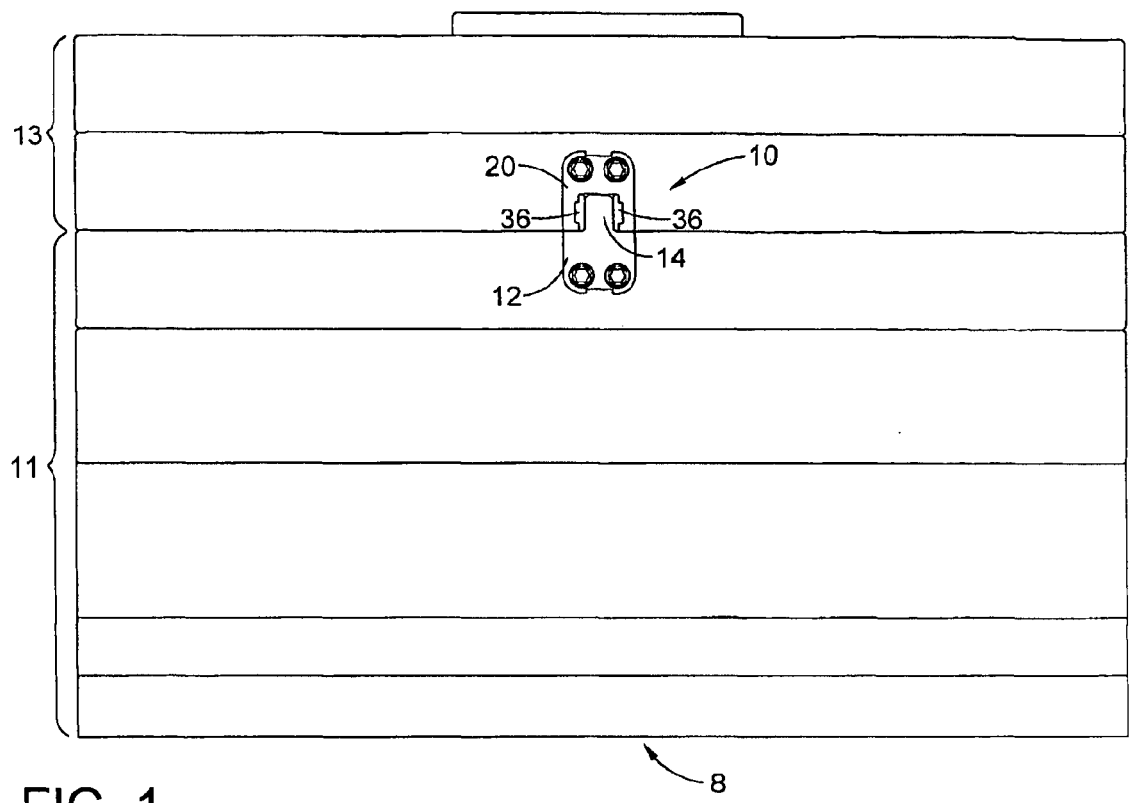
FIG. 1 is a front elevational view of a mold assembly including a mold positioning system in accordance with the present invention, showing the mold segments closed.
Figure 2:
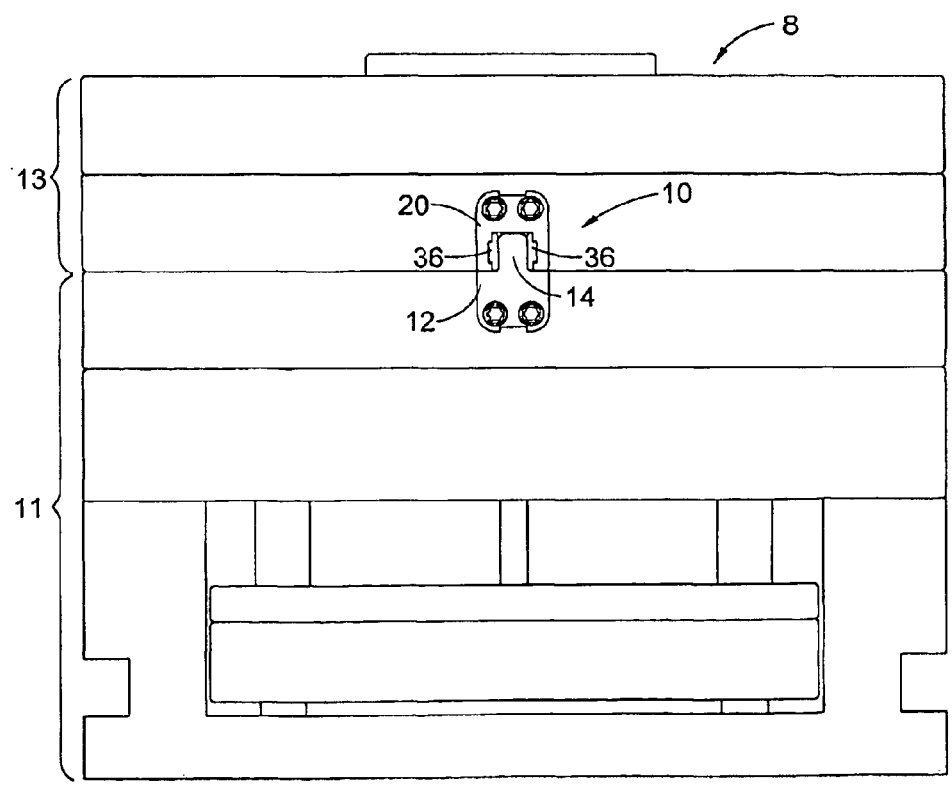
FIG. 2 is a side elevational view of the mold assembly shown in FIG. 1.
Figure 8:
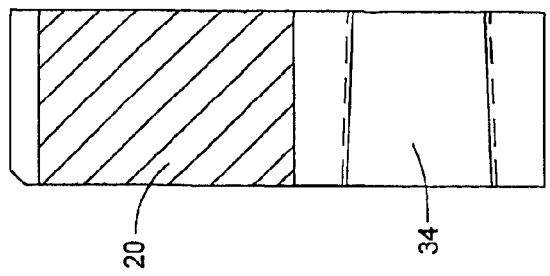
FIG. 8 is a cross-sectional view taken along the line A—A of FIG. 6.

Referring to the drawings, wherein like numerals indicate like or corresponding parts throughout the several Figures, a mold positioning system 10 for use in guiding and aligning first and second mold segments 11, 13 in a mold assembly 8 during a molding operation is generally shown in FIGS. 1 and 2. Typically, the mold assembly 8 will include the mold positioning system 10 on each of the four sides, as shown in FIG. 3.

Referring to FIGS. 1 through 5, the mold positioning system 10 includes a male member 12 having a tongue portion 14 and a pair of bores 16, 18 for allowing removable attachment of the male member 12 by suitable fastening means, such as cap screws, into suitably sized pockets or recesses formed in the first mold segment 11. The system also includes a female member 20, as shown in FIG. 4, also including a pair of bores 22, 24 to allow the removable attachment of the female member 20 into suitably sized pockets or recesses formed in the second mold segment 13. Typically, both the male member 12 and female member 20 would be manufactured from a standard grade of tool steel, such as H-13. It is to be understood that attachment of the male and female members 12, 20 to the first and second mold segments 11, 13 can be accomplished using of variety of attaching methods. For example, a single bore could be used for attaching the male and female members 12, 20 to their respective mold segments 11, 13. In addition, the relative orientation of the male member 12 and female member 20 could be reversed, if desired, so that the male member 12 is attached to the second mold segment 13 and the female member 20 is attached to the first mold segment 11.

Figure 6:
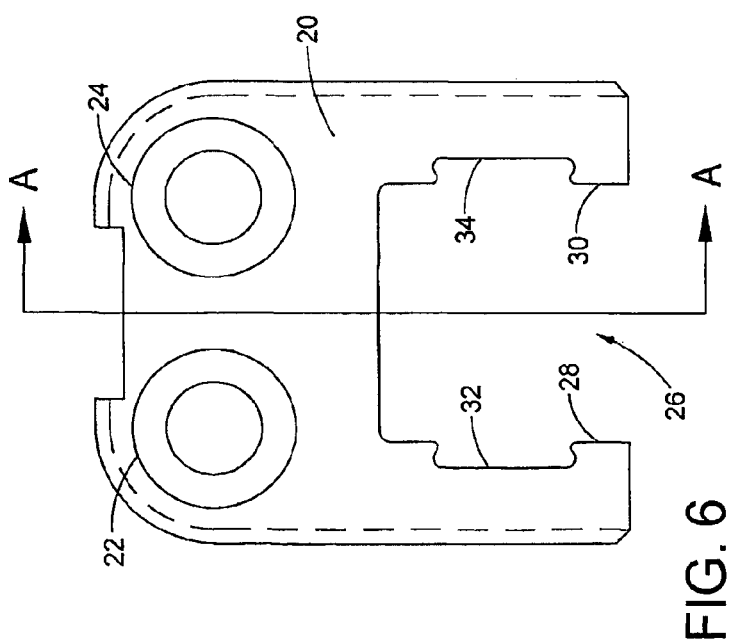
FIG. 6 is a front elevational view of a female member in accordance with the present invention as shown in FIGS. 1 through 5.
Figure 7:
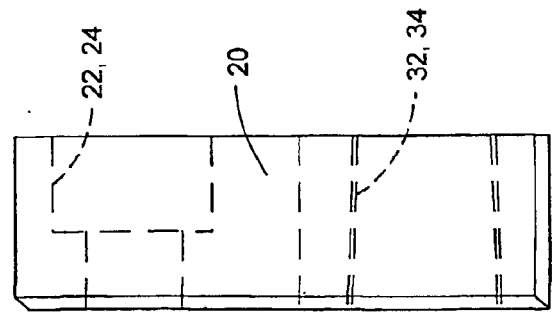
FIG. 7 is a side elevational view of the female member shown in FIG. 6.

A groove 26 having first and second inner surfaces 28, 30, as shown in FIGS. 4 through 6, is formed within the female member 20 for receiving the tongue portion 14 of the male member 12 when closing the mold assembly 8.

Figure 9:
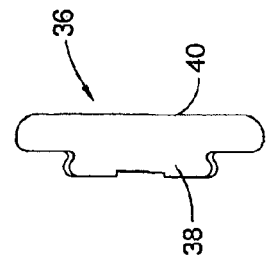
FIG. 9 is a front elevational view of a replaceable insert in accordance with the mold positioning system of the present invention.
Figure 10:
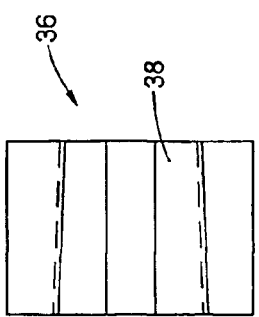
FIG. 10 is a side elevational view of the replaceable insert shown in FIG. 9.

A first channel 32 is formed within the first inner surface 28 of the groove 26 and in the preferred embodiment a second channel 34 is formed within the second inner surface 30 of the groove 26. The first channel 32 is shaped to receive a replaceable insert 36 having a base portion 38 for positioning the replaceable insert 36 in the first channel 32 of the first inner surface 28. The replaceable insert, as shown in FIGS. 9 and 10, further includes a flange portion 40 for engaging the tongue portion 14 of the male member 12 when closing the mold assembly 8. The replaceable insert can be manufactured from a variety of materials suitable for this type of application, for example, aluminum bronze and H-13 tool steel. The second channel 34 is preferably the mirror image of the first channel 32, so that it is also shaped to receive the replaceable insert 36, rotated 180° from the insert 36 positioned in the first channel 32. With this configuration, the flange portion 40 of the replaceable insert 36 in the second channel 34 will likewise engage the tongue portion 14 of the male member 12 when the mold assembly 8 is closed.

When the mold assembly 8 is in the closed position shown in FIG. 4, the replaceable inserts 36 provide barriers 48, 50 between the tongue portion 14 of the male member 12 and the inner surfaces 28, 30 of the female member 20, so that the wear resulting from insertion of the tongue portion 14 into the groove 26 is imparted to the replaceable inserts 36, rather than the inner surfaces 28, 30. If desired, the replaceable insert 36 can be provided with means to indicate the extent to which the insert 36 is worn. For example, the surface of the flange 40 of the insert 36 can include longitudinal grooves with a minimal depth, e.g., 0.001 inch, so that the user will know to replace the insert 36 at the point where the surface of the flange 40 is worn smooth.

Each replaceable insert 36 is designed to be removable from the channels 32, 34 to facilitate easy replacement. In particular, as shown in FIGS. 7 through 10, the channels 32, 34 and base portion 38 of insert 36 are slightly tapered. With these parts tapered as shown, the inserts 36 are inserted in the channels 32, 34 before the female member 20 is assembled to the mold segment 13. The bottom of the recess in the mold segment 13 holds the insert 36 at one end and the taper keeps the insert 36 from moving relative to the associated channel 32, 34. As described above, in the preferred embodiment the female member 20 is configured to receive two identical replaceable inserts 36. However, it is to be understood that the replaceable insert and associated channel could have different shapes for each side of the groove 26, so as to provide unique inserts for "left" and "right" sides of the groove 26 of the female member 20.

A second embodiment of the subject invention includes the features described above, except that the replaceable inserts 36 are attached to the male member 12 rather than the female member 20. Accordingly, the channels used to hold the inserts 36 are removed from the female member 20, as shown in FIG. 11. Referring to FIGS. 12 through 14, the tongue portion 14 of the male member 12 further includes a first side 52 and a second side 54. A channel 56 is formed within the first side 52 and a similar channel 58 is formed within the second side 54. The replaceable insert 36 described above is positioned in the channel 56 of the first side 52 and another replaceable insert 36 is positioned in the channel 58 of the second side 54.

A rectangular retainer plate 64 having an attachment bore 66 is attached to the male member 12. A screw 69 or similar fastener passes through the attachment bore 66 and into a threaded retainer bore 68 in the male member 12 to secure the retainer plate 64 to the male member 12 and thereby hold the replaceable inserts 36 in the tapered channels 56, 58. It is to be understood that the taper for the channels 56, 58 of the second embodiment of the subject invention are tapered in the opposite direction from the channels 32, 34 of the female member 20 shown FIGS. 6 through 8. In other words, the channels 52, 54 are wider at the front, so that the inserts 36 are installed from the front of the male member 12 and held in place by the retainer plate 64. In contrast, the channels 32, 34 are wider at the back so that the inserts 36 are installed from the rear of the female member 20 and held in place by the bottom of the mounting recess, as described above.

Referring to FIGS. 16 and 17, a third embodiment is created by combining elements of the two embodiments described previously. In other words, the third embodiment utilizes the replaceable inserts 36 in both the male member 12 and the female member 20. By placing the replaceable inserts 36 in both the male member 12 and female member 20, the wear resulting from repeated opening and closing of the mold assembly 8 is imparted only to the replaceable inserts 36. With the mold positioning system configured as shown in this embodiment, the members 12, 20 are not subject to wear and will last indefinitely with timely replacement of the inserts 36.

Additional embodiments the mold positioning system of the present invention are realized by combining elements of the three embodiments described above with the male and female members of various mold interlock constructions, as known in the industry. While the previously described embodiments are generally for "straight" side interlocks, the present invention can also be used in association with "X-style" side interlocks, as shown in FIG. 18. In this type of mold construction, an intermediate plate 15 is used to create parting lines with both of the mold segments 11, 13. The male member 12a has two tongue portions 14 extending in opposite directions to engage female members 20 with removable inserts 36 on each of the mold segments 11, 13. As described for the other embodiments, the removable inserts 36 can be used in connection with any or all of the wear surfaces of the male member 12a and female members 20, as desired.

In addition, similar configurations can also be used for "parting line" interlocks. For parting line interlock constructions, it is common in the industry for the female member to comprise two separate blocks 20a attached in a recess to define the groove 26, and the male member to comprise a single block 12b attached in a recess to define the tongue 14, as shown in FIG. 19. Finally, it should be understood that the subject invention is not limited to the description set forth herein, as the invention could be accomplished by the use of only one replaceable insert 36 in association with the surface subject to the most wear in a particular application of a mold assembly 8.

INDUSTRIAL APPLICABILITY

The foregoing discussion and illustrated embodiments of the invention teach a mold positioning system that allows for the use of replaceable inserts in the heavy wear areas of the system. The life of the male and female members is increased in the subject invention by utilizing replaceable inserts to provide an alternative wear surface for the system. Since the inserts are economical and easily changed, the system will help to reduce costs and increase productivity and efficiency.

Although particular embodiments of the present invention have been illustrated and described, it will be apparent to those skilled in the art that changes in modifications can be made without departing from the concepts of the present invention. Accordingly, it is intended to encompass within the appended claims all such changes and modifications that fall within the scope of the present invention.

What is claimed is:

1. A mold positioning system (10) for use in guiding and aligning first and second mold segments (11, 13) in a mold assembly (8), wherein the mold positioning system (10) comprises (a) a male member (12) attached to the first mold segment (11) and having a tongue portion (14) with first and second sides (52, 54); and (b) a female member (20) attached to the second mold segment (13) and having a groove (26) with first and second inner surfaces (28, 30) configured to receive the tongue portion (14) of the male member (12) so that the first and second sides of the tongue portion (14) are adjacent the first and second inner surfaces of the groove (26) when closing the mold assembly (8); characterized in that the mold positioning system (10) further comprises:

a channel (32, 34, 56, 58) formed within at least one of the first and second sides and first and second inner surfaces of the male member (12) and female member (20) respectively; and at least one replaceable insert (36) having a base portion (38) configured to be received by a channel and a flange portion (40) having at least one edge overhanging the base portion, the flange portion serving as a wear surface, the replaceable insert (36) being removable from the channel for replacement to increase the life of the male and female members (12, 20).

2. The mold positioning system (10) in accordance with claim 1 characterized in that both the first and second inner surfaces (28, 30) of the groove (26) in the female member (20) include a channel (32, 34) that receives the base portion of a replaceable insert, so that each inner surface of the female member (20) is provided with a wear surface by the flange portion (40) of the replaceable inserts (36).

3. The mold positioning system (10) in accordance with claim 1 characterized in that both the first and second sides (52, 54) of the tongue portion (14) of the male member (12) include a channel (56, 58) that receives the base portion of a replaceable insert (36), so that each of the first and second sides of the male member (12) is provided with a wear surface by the flange portion (40) of the replaceable inserts (36).

4. The mold positioning system (10) in accordance with claim 3 characterized in that a retaining plate (64) is attached to the tongue portion (14) of the male member (12) to hold the replaceable inserts (36) in the channels (56, 58).

5. The mold positioning system (10) in accordance with claim 1 characterized in that the channel (32, 34, 56, 58) end the base portion (38) of the replaceable insert (36) have mating tapered surfaces.

6. The mold positioning system (10) in accordance with claim 1 characterized in that both the first and second inner surfaces (28, 30) of the groove (26) in the female member (20) and both the first and second sides (52, 54) of the tongue portion (14) of the male member (12) include a channel (32, 34, 56, 58) that receives the base portion of a replaceable insert (36), so that all of the first and second sides and first and second inner surfaces of the male and female members (12, 20) are provided with wear surfaces by the flange portion (40) of the replaceable inserts (36).

7. The mold positioning system (10) in accordance with claim 1 characterized in that the first and second inner surfaces (28, 30) of the groove (26) in the female member (20) are defined by two rectangular blocks (20a) received within a recess in the second mold segment (13).

8. A mold positioning system (10) for use in guiding and aligning multiple mold segments (11, 13, 15) in a mold assembly, wherein the mold positioning system (10) comprises a first female member (20) attached to a first mold segment (11) and having a groove (26) with first and second inner surfaces (28, 30); a second female member (20) of substantially the same construction as the first female member (20), the second female member (20) being attached to a second mold segment (13); a male member (12a) attached to an intermediate mold segment (15) and having two tongue portions(14) extending in opposite directions, each tongue portion (14) having first and second sides (52, 54); such that the inner surfaces of the female members (20) are configured to receive the tongue portions (14) of the male member (12a) so that the sides of the tongue portions (14) are adjacent the inner surfaces of the associated grooves (26) when closing the mold assembly; characterized in that the mold positioning system (10) further comprises:

a channel (32, 34, 56, 58) formed within at least one of the sides and inner surfaces of the male member (12a) and female members (20) respectively; and at least one replaceable insert (36) having a base portion (38) configured to be received by the channel and a flange portion (40) having at least one edge overhanging the base portion, the flange portion serving as a wear surface, the replaceable insert (36) being removable from the channel for replacement to increase the life of the male and female members (12a, 20).

* * * * *